Sept. 2, 1941. M. TIBBETTS 2,254,332
MOTOR VEHICLE
Filed June 13, 1939 3 Sheets-Sheet 1

INVENTOR.
Milton Tibbetts
BY
Tibbetts & Hart
ATTORNEYS

Sept. 2, 1941.  M. TIBBETTS  2,254,332
MOTOR VEHICLE
Filed June 13, 1939   3 Sheets-Sheet 2

INVENTOR.
Milton Tibbetts
BY
Tibbetts & Hart
ATTORNEYS

Sept. 2, 1941.   M. TIBBETTS   2,254,332
MOTOR VEHICLE
Filed June 13, 1939   3 Sheets-Sheet 3
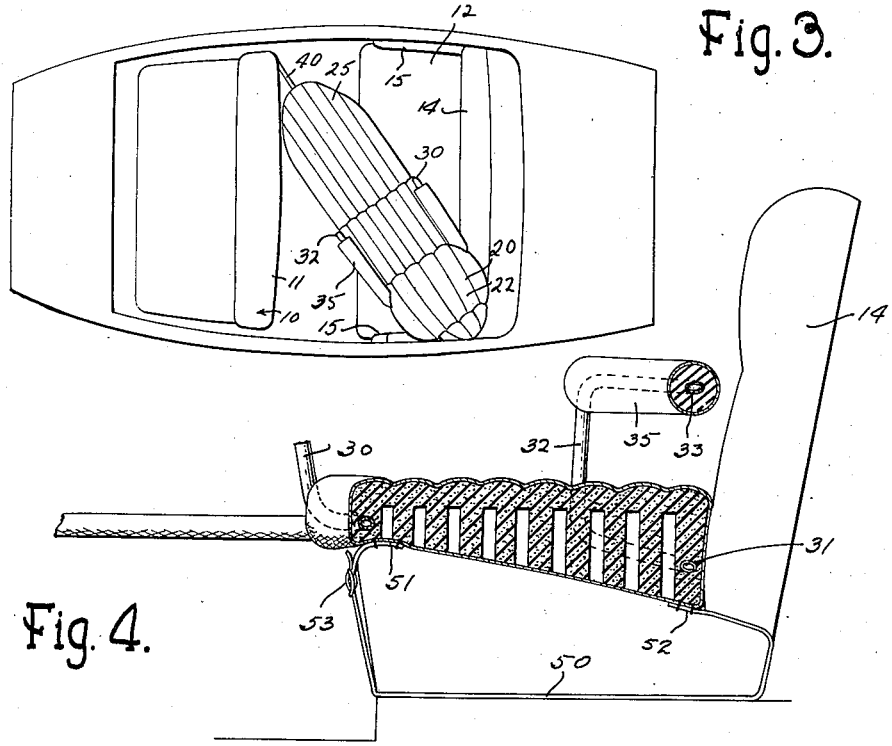
Fig. 3.
Fig. 4.
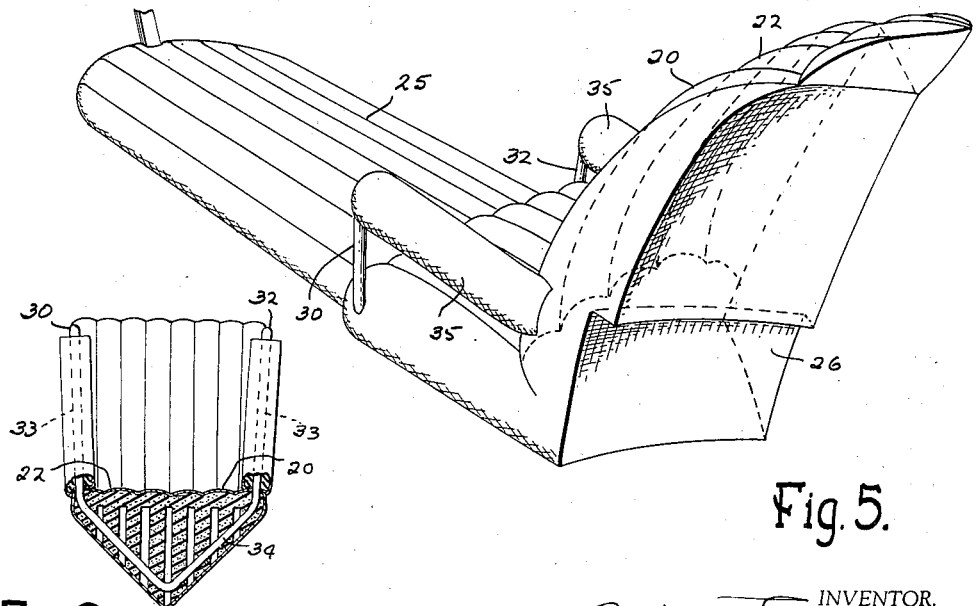
Fig. 5.
Fig. 6.
INVENTOR.
Milton Tibbetts
BY Tibbetts & Hart
ATTORNEYS Patented Sept. 2, 1941

2,254,332

UNITED STATES PATENT OFFICE 2,254,332

MOTOR VEHICLE

Milton Tibbetts, Detroit, Mich., assignor to Packard Motor Car Company, Detroit, Mich., a corporation of Michigan Application June 13, 1939, Serial No. 278,937

10 Claims. (Cl. 155—131)

This invention relates to motor vehicles and particularly to body seat and seat back construction.

On long drives in motor vehicles with two or more people alternating in driving it is very difficult for the person or persons not driving to find a restful position in the car. Particularly is this true in the conventional five-passenger car where the front and rear seats are arranged fairly closely together. There are two reasons for this, first because every seating provided for places the passenger in a substantially upright position so that he can see the road, and as long as one can see the road the nervous tension is almost as great as that of the driver; and second, there is no provision for a person to take a semi-reclining position, and particularly no way in which he can stretch out and get his feet up as high as the seat.

Numerous attempts have been made at putting reclining seats in a car and even going so far as to make provision for a bed by pivoting the back of the front seat, but all of these require changes in the body or seat structure which produces a compromise car. Since the bed feature would at most be used but a very small percentage of the time this compromise type of car has found very little sale.

An object of the present invention is to provide a conventional motor vehicle with a seat on the order of a chaise longue which may be placed in the body of the vehicle and removed therefrom without altering the body itself or the fixed seats thereof.

Most five-passenger automobile bodies of today have the front and rear seats so close together that a person in the rear seat cannot recline facing forward and stretch his feet out because the back of the front seat is in the way. Also, a person in the front seat next to the driver cannot stretch his feet out because the dash is too near the seat and if he attempted to put his feet up as high as the seat he would interfere with some of the machinery under the cowl such as the heater or radio. But I have found that in these same cars there is sufficient room for semi-reclining if one takes a diagonal position from one corner of the rear seat to the opposite corner of the back of the front seat. Here a six-foot person could easily semi-recline if seating provision was available. Hence it is an object of the present invention to provide a diagonally arranged seat for a motor vehicle extending from one corner of the conventional seat cushion toward the opposite side of the back of the seat in front thereof.

Another object of the invention is to provide a diagonally arranged seat for one corner of the conventional seat cushion of a motor vehicle and a foot-rest or leg-rest extending in front of said seat and supported at substantially the seat level.

Another object of the invention is to provide an inclined seat back to fit in the corner above the conventional seat cushion of a motor vehicle which seat back faces diagonally from one corner to another of the rear compartment of the vehicle thus providing room for a person to rest against the seat back and stretch his feet out comfortably in front of him.

Another object of the invention is to provide a semi-reclining seat for a motor vehicle that may be placed on the conventional seat cushion of the vehicle and used without changing anything about the other seats and which when removed will leave the vehicle in its original state.

Other objects of the invention will appear from the following description taken in connection with the drawings which form a part of this specification, and in which:

Fig. 3 is a smaller plan view showing the diagonal arrangement of the semi-reclining seat;

Fig. 4 is a section substantially on the line 4—4 of Fig. 2;

Fig. 5 is a rear quarter view of the semi-reclining seat removed from the vehicle; and Fig. 6 is a section through the seat showing the tubular frame thereof.

Figure 1:
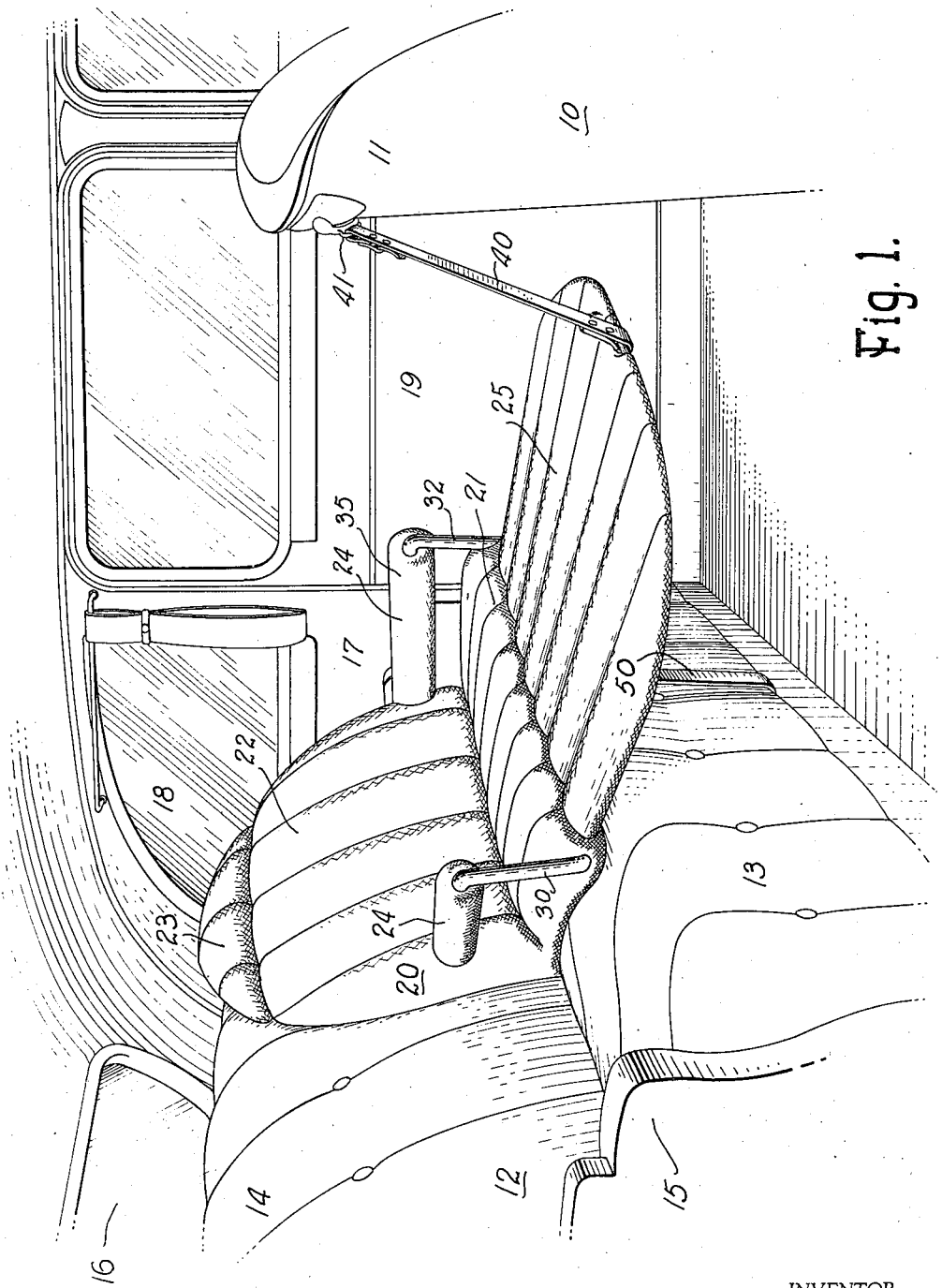
Figs. 1 and 2 are perspective views, taken at different angles, of the interior of a motor vehicle with the seat of this invention arranged therein.

Referring to the drawings, 10 represents a motor vehicle body of the conventional five-passenger type, having a front seat 11, only the back of which appears in Fig. 1, a rear seat 12 comprising a seat cushion 13, a seat back 14 and side arms 15, rear windows 16, side walls or rear quarters 17 with windows 18, and doors 19, one at each side of the rear compartment of the vehicle. It will be seen that a corner of the rear seat is formed by the seat cushion 13, the seat back 14, one of the rear quarters 17, and the side arm 15, the latter projecting from the body panel which forms the rear quarter. In one of these corners the semi-reclining seat of this invention is placed. The numeral 20 represents this seat or seat unit and it comprises a seat portion 21, an inclined back portion 22, a head rest 23, arm rests 24, and a foot or leg rest 25. This seat 20 may be made of any suitable material and is shown as formed of sponge rubber covered with upholstery cloth. It is shaped to fit the seat cushion 13, which is higher in front than it is at the back, and into the corner of the vehicle seat. Thus the back portion 22 is triangular in shape at the bottom providing a broad base where it rests on the seat cushion 13 and in fact is substantially triangular in cross-section throughout since it fits into the corner formed by the quarter panel 17 and the seat back 14. It is shown as tapering upwardly, having its front face considerably inclined to the vertical so that one resting thereon may assume a semi-reclining position, and its rear upright faces are angularly related to correspond substantially to the surfaces of the compartment seat corner. A part of one rear face of the back portion 22 may be cut away as at 26 to make a better fit around the side arm 15, thus assisting in holding the back portion in upright position, or the back portion may be made soft enough to conform to the irregularities of the corner without close fitting thereto.

Figure 2:
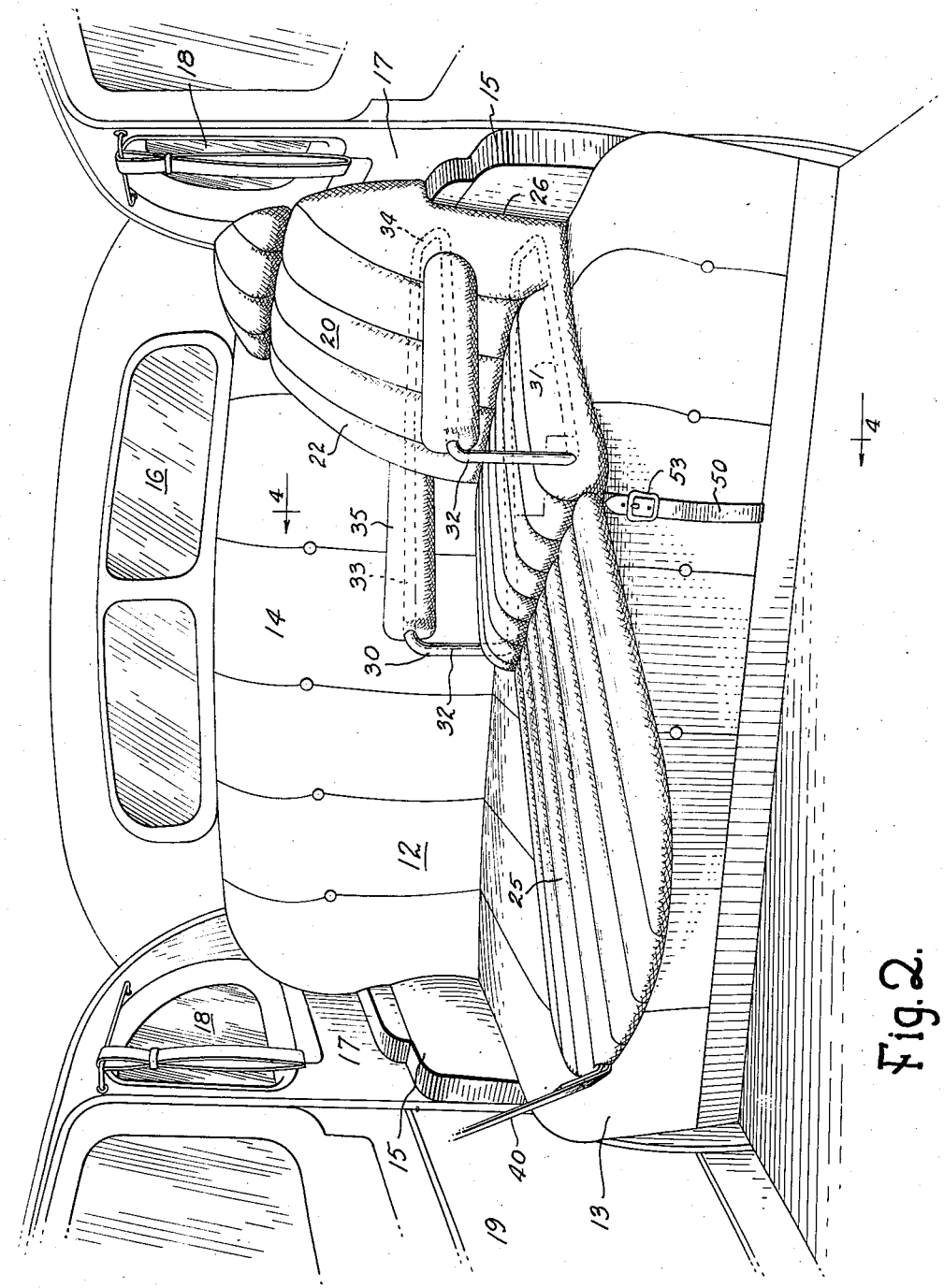

Sufficient frame work for supporting the various portions of the seat 20 may be provided and one form of such frame work is shown as a single piece of tubing 30 the general configuration of which is shown in full and dotted lines in Figure 2. Thus there is the U-shaped bottom portion 31 of this tubular frame, the open part of the U being at the front of the seat portion 21. The frame has upright portions 32 and an upper U-shaped portion 33. The rear cross member of one or both U-shaped portions may be of slightly V-shape as shown particularly at 34 in Figures 2 and 6, to conform to the triangular shape of the back portion 22 of the seat. The sides of the portion 33 of the frame form the arms of the seat 20 and are preferably upholstered as shown at 35.

The foot rest portion 25 of the seat 20 may be detachably or otherwise connected to the seat portion 21 thereof and its forward or free end may be supported in any desirable manner so that the foot rest will extend in a substantially horizontal position from the seat portion 21. As shown the foot rest is supported by a strap 40 from a suitable ring 41 connected to the back 11 of the front seat at the opposite side of the vehicle from the corner in which the seat 20 is placed.

The reclining seat or chaise longue 20 may be secured in place so that the movement of the vehicle will not dislodge it, and one means for thus securing it is shown in the form of a strap 50 the two parts of which are connected to the seat portion 21 as at 51 and 52, respectively. One part of the strap 50 may extend around the seat cushion 13 and be connected to the other part as by a buckle 53. The construction is shown in Figures 1, 2 and 4.

It will be observed that the reclining seat or chaise longue 20 is so formed and so positioned in the vehicle body that a person may be seated therein in a semi-reclining position with his feet stretched out on the foot-rest 25 and with his head resting on the head-rest 23, and in the diagonal position of the seat the conventional car provides ample room for this stretched-out comfortable position. Also, the reclining seat may be easily removed and the conventional seating of the vehicle is not interfered with in any way.

While I have herein described in some detail a specific embodiment of my invention, which I deem to be new and advantageous and may specifically claim, I do not desire it to be understood that my invention is limited to the exact details of the construction, as it will be apparent that changes may be made therein without departing from the spirit or scope of my invention.

What I claim is:

1. In a motor vehicle having a corner thereof formed by the seat cushion, the back cushion, and the side wall, the combination of a seat unit shaped to fit into said corner and rest on said seat cushion and comprising an inclined back portion, a seat portion, side arms above the seat portion, and means comprising a frame supporting the arms and back portion from the seat portion.

2. In a motor vehicle, the combination of a seat cushion, back cushion, and side wall forming a seat corner, the seat cushion being lower at the back than at the front, a seat unit adapted to rest in said corner on the seat cushion and comprising a tapered seat portion thicker at the back than at the front and a back portion having angularly related rear faces to fit into said corner.

3. A seat back unit of the chaise longue type adapted for diagonal positioning in the rear compartment of a motor vehicle and to fit into and be removed from the corner of the seat of said compartment, comprising a back part and a head rest part, said back part formed at the rear with upright angularly related faces to correspond substantially to surfaces of said compartment seat corner and at the front with a surface considerably inclined to the vertical so that one resting thereon may assume a semi-reclining position, the considerable angle thus formed between rear and front surfaces of the back part forming a broad base for the back part adapting it to be self supporting on the vehicle seat, said head rest part forming a continuation of the back part, and both said parts being formed of yielding material to adapt them to corners of somewhat different shapes and to comfortably support the user.

4. A seat for a motor vehicle comprising a seat portion and a back portion, and a frame therefor including a bottom U-shaped portion extending along both sides and in the rear of the seat, an upper U-shaped portion forming the arms and engaging the back to form a support therefor, and upright portions at the fronts of the arms connecting said arms with the bottom U-shaped portion.

5. The combination with a motor vehicle body including a seat cushion, a back cushion and a side wall, the back cushion and side wall forming a corner above the seat cushion, of a seat unit comprising a seat part adapted to rest on said seat cushion and face diagonally forward and across the vehicle and a connected back part formed at the rear with angularly related faces to fit into said corner and said back part inclined at the front to a semi-reclining position.

6. The combination with a motor vehicle body including a seat cushion, a back cushion and a side wall, the back cushion and side wall forming a corner above the seat cushion, of a seat unit comprising a seat part adapted to rest on said seat cushion and face diagonally forward and across the vehicle and a connected back part formed at the rear with angularly related faces to fit into said corner and said back part being considerably thicker at its base than at its top to provide a semi-reclining diagonally arranged front surface meeting said seat part at the bottom.

7. A seat unit of the chaise longue type adapted for diagonal positioning in the rear compartment of a motor vehicle and to be fitted into and be removed from the corner of the seat of said compartment, comprising connected seat and back parts, the seat part adapted to rest on the said compartment seat and the back part formed with its front surface at a considerable angle to its rear surface to provide a semi-reclining back resting surface and also formed at the rear with angularly related faces to correspond substantially to surfaces of said compartment seat corner.

8. A seat unit of the chaise longue type adapted for diagonal positioning in the rear compartment of a motor vehicle and to fit into and be removed from the corner of the seat of said compartment, comprising connected seat, back and leg rest parts, the back part formed with its front surface considerably inclined to the vertical and its rear with angularly related faces to conform substantially to the surfaces of said compartment seat corner, and said leg rest part having means to support its free end.

9. The combination with a motor vehicle body having front and rear seats and side walls, the rear seat including a seat cushion and back cushion, the back cushion and one side wall forming a corner above the seat cushion, of a seat unit having connected seat, back and leg rest portions, the seat portion resting on the seat cushion, the back portion having angularly related faces at the rear to fit into said corner and having a semi-reclining front face, said seat and back portions facing diagonally in the vehicle rear compartment, and said leg rest portion extending forwardly from the front of the seat portion and in a substantially horizontal plane.

10. The combination with a motor vehicle body having front and rear seats and side walls, the rear seat including a seat cushion and a back cushion, the back cushion and one side wall forming a corner above the seat cushion, of a seat unit having connected seat, back and leg rest portions, the seat portion resting on the seat cushion, the back portion having angularly related faces at the rear to fit into said corner and having a semi-reclining front face, said seat and back portions facing diagonally in the vehicle rear compartment, and said leg rest portion extending forwardly from the front of the seat portion and in a substantially horizontal plane, and means for supporting the free end of the leg rest from the back of the front seat.

MILTON TIBBETTS.